US012357033B2

(12) United States Patent
Park et al.

(10) Patent No.: US 12,357,033 B2
(45) Date of Patent: Jul. 15, 2025

(54) AEROSOL GENERATING DEVICE AND OPERATION METHOD THEREOF

(71) Applicant: KT&G CORPORATION, Daejeon (KR)

(72) Inventors: Sang Kyu Park, Seoul (KR); Jae Min Lee, Siheung-si (KR)

(73) Assignee: KT&G CORPORATION, Daejeon (KR)

( * ) Notice: Subject to any disclaimer, the term of this patent is extended or adjusted under 35 U.S.C. 154(b) by 991 days.

(21) Appl. No.: 17/265,918

(22) PCT Filed: Nov. 9, 2020

(86) PCT No.: PCT/KR2020/015625
§ 371 (c)(1),
(2) Date: Feb. 4, 2021

(87) PCT Pub. No.: WO2021/096182
PCT Pub. Date: May 20, 2021

(65) Prior Publication Data
US 2022/0338552 A1 Oct. 27, 2022

(30) Foreign Application Priority Data
Nov. 12, 2019 (KR) ........................ 10-2019-0144531

(51) Int. Cl.
*A24F 40/57* (2020.01)
*A24F 40/20* (2020.01)
(Continued)

(52) U.S. Cl.
CPC .............. *A24F 40/57* (2020.01); *A24F 40/20* (2020.01); *A24F 40/46* (2020.01); *H05B 1/0244* (2013.01); *H05B 2203/037* (2013.01)

(58) Field of Classification Search
CPC .......... A24F 40/20; A24F 40/46; A24F 40/57; H05B 1/0244; H05B 2203/037
(Continued)

(56) References Cited

U.S. PATENT DOCUMENTS 5,896,081 A * 4/1999 Tzeng .................. H01C 17/006
374/E7.022
10,813,174 B2 10/2020 Schneider et al.
(Continued)

FOREIGN PATENT DOCUMENTS

CN 208192124 U 12/2018
JP 2019-518430 A 7/2019
(Continued)

OTHER PUBLICATIONS

English translation for KR 10-2018-0070513 (Year: 2018).*
(Continued)

*Primary Examiner* — Sang Y Paik
(74) *Attorney, Agent, or Firm* — Sughrue Mion, PLLC

(57) ABSTRACT

An aerosol generating device includes: a heater including a first electrically conductive track and a second electrically conductive track having a higher temperature coefficient of resistance than the first electrically conductive track; and a controller configured to heat a cigarette accommodated in the aerosol generating device by using the first electrically conductive track in a first temperature change section and heat the cigarette by using the second electrically conductive track in a second temperature change section.

7 Claims, 6 Drawing Sheets

(51) Int. Cl.
*A24F 40/46* (2020.01)
*H05B 1/02* (2006.01)

(58) Field of Classification Search
USPC .................................. 392/386–406; 131/299
See application file for complete search history.

(56) References Cited

U.S. PATENT DOCUMENTS

| | | | |
|---|---|---|---|
| 11,197,497 | B2 | 12/2021 | Lee et al. |
| 11,235,109 | B2 | 2/2022 | Thorsen et al. |
| 2006/0186112 | A1* | 8/2006 | Valiyambath Krishnan ................ D06F 75/26 219/492 |
| 2015/0163859 | A1* | 6/2015 | Schneider ............... A24F 40/46 219/535 |
| 2016/0360786 | A1* | 12/2016 | Bellinger ................ A24F 40/46 |
| 2018/0303161 | A1 | 10/2018 | Bilat |
| 2019/0124982 | A1* | 5/2019 | Atkins ................. A61M 11/042 |
| 2019/0166918 | A1 | 6/2019 | Thorsen et al. |
| 2019/0223511 | A1 | 7/2019 | Smith et al. |
| 2019/0380390 | A1 | 12/2019 | Jeong et al. |
| 2020/0093177 | A1 | 3/2020 | Han et al. |
| 2020/0093185 | A1 | 3/2020 | Lim |
| 2020/0103796 | A1* | 4/2020 | Furuichi ............ G03G 15/2042 |
| 2020/0154772 | A1 | 5/2020 | Lim et al. |
| 2020/0253280 | A1 | 8/2020 | Thorsen |
| 2020/0352231 | A1 | 11/2020 | Han et al. |
| 2021/0106051 | A1 | 4/2021 | Han et al. |

FOREIGN PATENT DOCUMENTS

| | | | |
|---|---|---|---|
| JP | 2019-531049 | A | 10/2019 |
| KR | 10-2018-0070513 | A | 6/2018 |
| KR | 1020180070439 | A | 6/2018 |
| KR | 1020180111460 | A | 10/2018 |
| KR | 10-2018-0120172 | A | 11/2018 |
| KR | 10-1940893 | B1 | 1/2019 |
| KR | 1020190022793 | A | 3/2019 |
| KR | 1020190049420 | A | 5/2019 |
| WO | 2017194769 | A1 | 11/2017 |
| WO | 2018/110834 | A2 | 6/2018 |
| WO | 2018/135888 | A1 | 7/2018 |
| WO | 2019/105879 | A1 | 6/2019 |
| WO | 2019/141577 | A1 | 7/2019 |

OTHER PUBLICATIONS

English translation for KR 10-2019-0049420 (Year: 2019).*
Office Action dated Nov. 19, 2021 from the Korean Intellectual Property Office in KR Application No. 10-2019-0144531.
Chinese Office Action dated Mar. 30, 2023 in Chinese Application No. 202080005248.0.
International Search Report dated Jun. 3, 2021, from the International application No. PCT/KR2020015625.
Communication dated May 27, 2021, from the Korean Intellectual Property in application No. 1020190144531.
Extended European Search Report dated Apr. 28, 2022 in European Application No. 20851272.3.
Office Action dated May 17, 2022 issued by the Japanese Patent Office in Japanese Application No. 2021-518168.

* cited by examiner

AEROSOL GENERATING DEVICE AND OPERATION METHOD THEREOF

TECHNICAL FIELD

One or more embodiments relate to an aerosol generating device and an operation method thereof.

BACKGROUND ART

Recently, the demand for alternatives to traditional cigarettes has increased. For example, there is growing demand for an aerosol generating device that generates an aerosol by heating an aerosol generating material or an aerosol generating article (e.g., a cigarette containing an aerosol generating material), without combusting traditional cigarettes.

An aerosol generating device may include a heater for heating a cigarette or an aerosol generating material. Therefore, there is a need for a technology for preventing heating of an unintended portion of the aerosol generating device and minimizing unnecessary power loss while providing an optimal smoking experience to a user.

DISCLOSURE

Technical Solution

One or more embodiments include an aerosol generating device and an operation method thereof. For example, the aerosol generating device may include a heater including a first electrically conductive track and a second electrically conductive track having a higher temperature coefficient of resistance than the first electrically conductive track, heat a cigarette accommodated in the aerosol generating device by using the first electrically conductive track in a first temperature change section, and heat the cigarette by using the second electrically conductive track in a second temperature change section. The technical problems to be achieved by the present disclosure are not limited to the technical problems as described above, and other technical problems may be inferred from the following embodiments.

Advantageous Effects

The aerosol generating device according to one or more embodiments may heat the cigarette accommodated in the aerosol generating device by using the first electrically conductive track having a low temperature coefficient of resistance in the preheating section, thereby increasing a current flowing through the heater fast. Accordingly, a time needed for preheating may be minimized. The aerosol generating device according to one or more embodiments may heat the cigarette by using the second electrically conductive track having a high temperature coefficient of resistance in a smoking section, thereby reducing a current flowing through the entire circuit including the heater. Therefore, heating of in an unintended portion of the aerosol generating device may be prevented, and unnecessary power loss may be minimized.

BEST MODE

Figure 1:
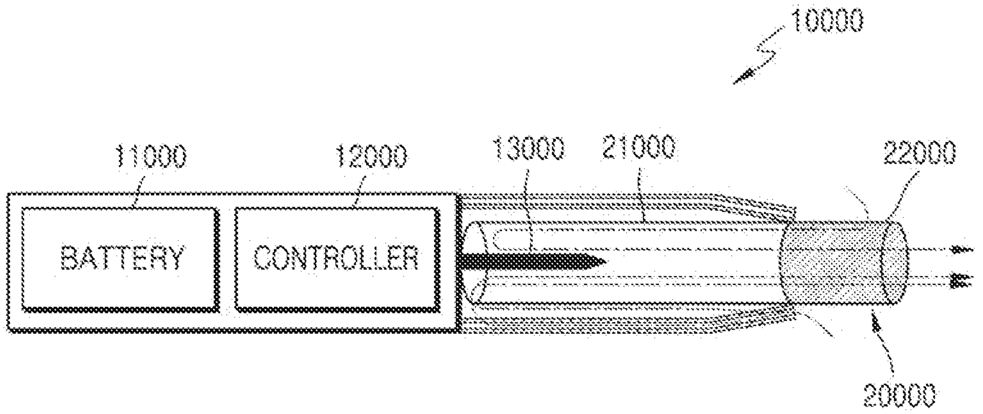
FIG. 1 is a diagram illustrating an aerosol generating device according to an embodiment.

According to one or more embodiments, an aerosol generating device includes: a heater including a first electrically conductive track and a second electrically conductive track having a higher temperature coefficient of resistance than the first electrically conductive track; and a controller configured to heat a cigarette accommodated in the aerosol generating device by using the first electrically conductive track in a first temperature change section and heat the cigarette by using the second electrically conductive track in a second temperature change section.

The first temperature change section may correspond to a preheating section for increasing a temperature of the heater up to an operation temperature, and the second temperature change section may correspond to a smoking section for substantially maintaining the temperature of the heater at the operation temperature.

A rate of change in the temperature of the heater over time may be greater than or equal to 8° C./s in the first temperature change section and less than 8° C./s in the second temperature change section.

The aerosol generating device may further include a battery supplying power to the heater, wherein the controller is further configured to control the battery to supply power to the first electrically conductive track in the first temperature change section, and control the battery to supply power to the second electrically conductive track in the second temperature change section.

The aerosol generating device may further include at least one switch configured to select between electrical connection between the battery and the first electrically conductive track and electrical connection of the battery and the second electrically conductive track, wherein the controller is further configured to control the at least one switch such that the battery supplies power to the first electrically conductive track in the first temperature change section and supplies power to the second electrically conductive track in the second temperature change section.

The controller may detect a resistance value of the second electrically conductive track, determine a temperature of the heater based on the detected resistance value and a temperature coefficient of resistance of the second electrically conductive track, and identify the first temperature change section and the second temperature change section based on the determined temperature.

A temperature coefficient of resistance of the first electrically conductive track may be less than 1,800 ppm/° C. in the first temperature change section, and a temperature coefficient of resistance of the second electrically conductive track may be greater than or equal to 2,500 ppm/° C. and less than 4,500 ppm/° C. in the first temperature change section.

According to one or more embodiments, a method of operating an aerosol generating device, includes: heating a cigarette accommodated in the aerosol generating device by using a first electrically conductive track in a first temperature change section; and heating the cigarette by using a second electrically conductive track having a higher temperature coefficient of resistance than the first electrically conductive track in a second temperature change section.

A computer-readable recording medium according to one or more embodiments includes a recording medium on which one or more programs including instructions for executing the above-described method have been recorded.

MODE FOR INVENTION

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used can be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

In addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

As used herein, expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that when an element or layer is referred to as being "over," "above," "on," "connected to" or "coupled to" another element or layer, it can be directly over, above, on, connected or coupled to the other element or layer or intervening elements or layers may be present. In contrast, when an element is referred to as being "directly over," "directly above," "directly on," "directly connected to" or "directly coupled to" another element or layer, there are no intervening elements or layers present. Like numerals refer to like elements throughout.

Hereinafter, the present disclosure will now be described more fully with reference to the accompanying drawings, in which exemplary embodiments of the present disclosure are shown such that one of ordinary skill in the art may easily work the present disclosure. The disclosure may, however, be embodied in many different forms and should not be construed as being limited to the embodiments set forth herein.

Hereinafter, embodiments of the present disclosure will be described in detail with reference to the drawings.

FIG. 1 is a diagram illustrating an aerosol generating device according to an embodiment.

Referring to FIG. 1, the aerosol generating device 10000 may include a battery 11000, a controller 12000, and a heater 13000. Also, an aerosol generating article 20000 (e.g., a cigarette) may be inserted into an inner space of the aerosol generating device 10000.

FIG. 1 shows the aerosol generating device 10000 with some elements related to the embodiment. Therefore, it will be understood by one of ordinary skill in the art related to the present embodiment that other general-purpose components may be further included in the aerosol generating device 10000, in addition to the components illustrated in FIG. 1.

FIG. 1 illustrates that the battery 11000, the controller 12000, and the heater 13000 are arranged in series, but the arrangement of these are not limited thereto. In other words, according to the design of the aerosol generating device 10000, the arrangement of the battery 11000, the controller 12000, and the heater 13000 may be modified.

When the cigarette 20000 is inserted into the aerosol generating device 10000, the aerosol generating device 10000 heats the heater 13000. The temperature of an aerosol generating material in the cigarette 20000 is raised by the heated heater 13000, and thus aerosol is generated. The generated aerosol is delivered to a user through a second portion 22000 of the cigarette 20000.

According to necessity, even when the cigarette 20000 is not inserted into the aerosol generating device 10000, the aerosol generating device 10000 may heat the heater 13000.

The battery 11000 supplies electric power to be used for the aerosol generating device 10000 to operate. For example, the battery 11000 may supply power for heating the heater 13000 and supply power for operating the controller 12000. Also, the battery 11000 may supply power for operations of a display, a sensor, a motor, etc. mounted in the aerosol generating device 10000.

The controller 12000 may generally control operations of the aerosol generating device 10000. In detail, the controller 12000 controls not only operations of the battery 11000 and the heater, but also operations of other components included in the aerosol generating device 10000. Also, the controller 12000 may check a state of each of the components of the aerosol generating device 10000 to determine whether or not the aerosol generating device 10000 is able to operate.

The controller 12000 may include at least one processor. A processor can be implemented as an array of a plurality of logic gates or can be implemented as a combination of a general-purpose microprocessor and a memory in which a program executable in the microprocessor is stored. It will be understood by one of ordinary skill in the art that the processor can be implemented in other forms of hardware.

The heater 13000 is heated by power supplied from the battery 11000. For example, when the cigarette 20000 is inserted into the aerosol generating device 10000, the heater 13000 may be located inside the cigarette 20000. Thus, the heated heater 13000 may increase a temperature of an aerosol generating material in the cigarette 20000.

The heater 13000 may include an electro-resistive heater. For example, the heater 13000 may include an electrically conductive track, and the heater 13000 may be heated when currents flow through the electrically conductive track. However, the heater 13000 is not limited to the example described above and may include all heaters which may be heated to a desired temperature. Here, the desired temperature may be pre-set in the aerosol generating device 10000 or may be set as a temperature desired by a user.

FIG. 1 illustrates that the heater 13000 is inserted into the cigarette 20000, but the position of the heater 13000 is not limited thereto. For example, the heater 13000 may include a tube-type heating element, a plate-type heating element, a needle-type heating element, or a rod-type heating element, and may heat the inside or the outside of the cigarette 20000, according to the shape of the heating element.

Also, the aerosol generating device 10000 may include a plurality of heaters 13000. Here, the plurality of heaters 13000 may be inserted into the cigarette 20000 or may be arranged outside the cigarette 20000. Also, some of the plurality of heaters 13000 may be inserted into the cigarette 20000 and the others may be arranged outside the cigarette 20000. In addition, the shape of the heater 13000 is not limited to the shape illustrated in FIG. 1, and may include various shapes.

The aerosol generating device 10000 may further include general-purpose components in addition to the battery 11000, the controller 12000, and the heater 13000. For example, the aerosol generating device 10000 may include a display capable of outputting visual information and/or a motor for outputting haptic information. Also, the aerosol generating device 10000 may include at least one sensor (e.g., a puff detecting sensor, a temperature detecting sensor, a cigarette insertion detecting sensor, etc.).

Also, the aerosol generating device 10000 may be formed as a structure where, even when the cigarette 20000 is inserted into the aerosol generating device 10000, external air may be introduced or internal air may be discharged.

Although not illustrated in FIG. 1, the aerosol generating device 10000 and an additional cradle may form together a system. For example, the cradle may be used to charge the battery 11000 of the aerosol generating device 10000. Alternatively, the heater 13000 may be heated when the cradle and the aerosol generating device 10000 are coupled to each other.

The cigarette 20000 may be similar as a general combustive cigarette. For example, the cigarette 20000 may be divided into a first portion 21000 including an aerosol generating material and a second portion 22000 including a filter or the like. Alternatively, the second portion 22000 of the cigarette 20000 may also include an aerosol generating material. For example, an aerosol generating material made in the form of granules or capsules may be inserted into the second portion 22000.

The first portion 21000 may be completely inserted into the aerosol generating device 10000, and the second portion 22000 may be exposed to the outside. In some embodiments, only a portion of the first portion 21000 may be inserted into the aerosol generating device 10000, or a portion of the first portion 21000 and a portion of the second portion 22000 may be inserted thereinto. The user may puff aerosol while holding the second portion 22000 by the mouth of the user. In this case, the aerosol is generated by the external air passing through the first portion 21000, and the generated aerosol passes through the second portion 22000 and is delivered to the user's mouth.

For example, the external air may flow into at least one air passage formed in the aerosol generating device 10000. For example, the opening and closing and/or a size of the air passage formed in the aerosol generating device 10000 may be adjusted by the user. Accordingly, the amount of smoke and a smoking impression may be adjusted by the user. As another example, the external air may flow into the cigarette 20000 through at least one hole formed in a surface of the cigarette 20000.

Hereinafter, an example of the cigarette 20000 will be described with reference to FIG. 2.

Figure 2:
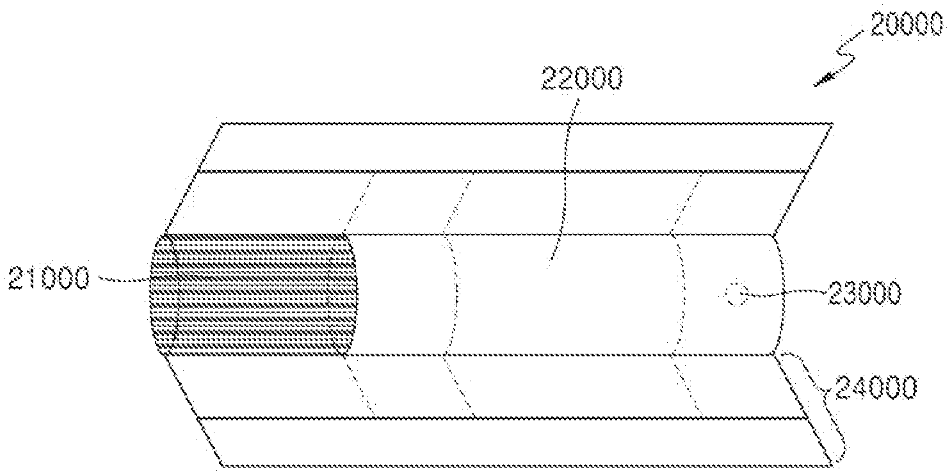
FIG. 2 shows a cigarette containing an aerosol generating material as an example of an aerosol generating article.

FIG. 2 shows a view showing a cigarette containing an aerosol generating material as an example of an aerosol generating article.

Referring to FIG. 2, the cigarette 20000 includes a tobacco rod 21000 and a filter rod 22000. The first portion 21000 described above with reference to FIG. 1 includes the tobacco rod 21000, and the second portion 22000 includes the filter rod 22000.

The filter rod 22000 illustrated in FIG. 2 is illustrated as a single segment, but is not limited thereto. In other words, the filter rod 22000 may include a plurality of segments. For example, the filter rod 22000 may include a first segment configured to cool an aerosol and a second segment configured to filter a certain component included in the aerosol. Also, according to necessity, the filter rod 22000 may further include at least one segment configured to perform other functions.

The cigarette 20000 may be packaged by at least one wrapper 24000. The wrapper 24000 may have at least one hole through which external air may be introduced or internal air may be discharged. For example, the cigarette 20000 may be packaged by one wrapper 24000. As another example, the cigarette 20000 may be double-packaged by at least two wrappers 24000. For example, the tobacco rod 21000 may be packaged by a first wrapper, and the filter rod 22000 may be packaged by a second wrapper. Also, the tobacco rod 21000 and the filter rod 22000, which are respectively packaged by separate wrappers, may be coupled to each other, and the entire cigarette 20000 may be packaged by a third wrapper. When each of the tobacco rod 21000 and the filter rod 22000 includes a plurality of segments, each segment may be packaged by a separate wrapper. Also, the entire cigarette 20000 including the plurality of segments, which are respectively packaged by the separate wrappers and which are coupled to each other, may be re-packaged by another wrapper.

The tobacco rod 21000 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. Also, the tobacco rod 21000 may include other additives, such as flavors, a wetting agent, and/or organic acid. Also, the tobacco rod 21000 may include a flavored liquid, such as menthol or a moisturizer, which is injected to the tobacco rod 21000.

The tobacco rod 21000 may be manufactured in various forms. For example, the tobacco rod 21000 may be formed as a sheet or a strand. Also, the tobacco rod 21000 may be formed as a pipe tobacco, which is formed of tiny bits cut from a tobacco sheet. Also, the tobacco rod 21000 may be surrounded by a heat conductive material. For example, the heat-conducting material may be, but is not limited to, a metal foil such as aluminum foil. For example, the heat conductive material surrounding the tobacco rod 21000 may uniformly distribute heat transmitted to the tobacco rod 21000, and thus, the heat conductivity applied to the tobacco rod may be increased and taste of the tobacco may be improved.

The filter rod 22000 may include a cellulose acetate filter. Shapes of the filter rod 22000 are not limited. For example, the filter rod 22000 may include a cylinder-type rod or a tube-type rod having a hollow inside. Also, the filter rod 22000 may include a recess-type rod. When the filter rod 22000 includes a plurality of segments, at least one of the plurality of segments may have a different shape.

The filter rod 22000 may be formed to generate flavors. For example, a flavoring liquid may be injected onto the filter rod 22000, or an additional fiber coated with a flavoring liquid may be inserted into the filter rod 22000.

Also, the filter rod 22000 may include at least one capsule 23000. Here, the capsule 23000 may generate a flavor or an aerosol. For example, the capsule 23000 may have a configuration in which a liquid containing a flavoring material is wrapped with a film. For example, the capsule 23000 may have a spherical or cylindrical shape, but is not limited thereto.

When the filter rod 22000 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited to the above-described example and is not limited as long as the cooling segment cools the aerosol.

Figure 3:
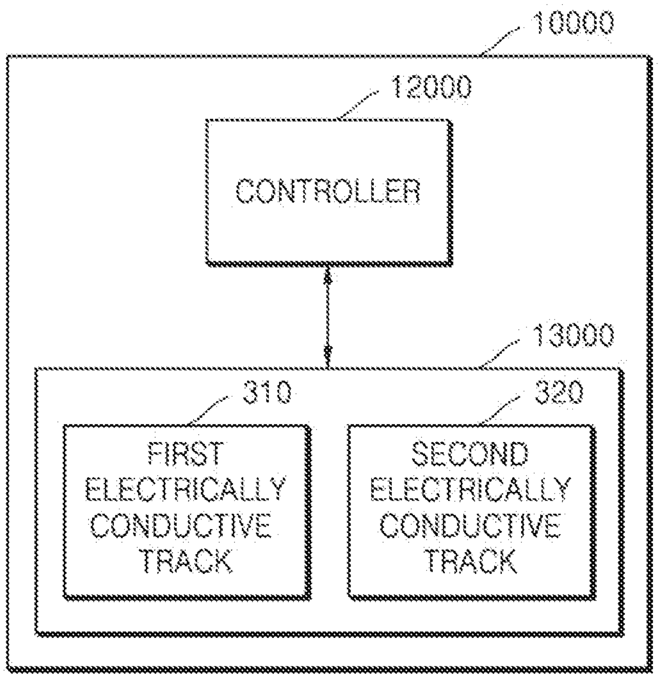
FIG. 3 is a block diagram illustrating a configuration of an aerosol generating device according to an embodiment.

FIG. 3 is a block diagram illustrating a configuration of an aerosol generating device according to an embodiment.

Referring to FIG. 3, an aerosol generating device 10000 may include a controller 12000 and a heater 13000. The controller 12000 and the heater 13000 of FIG. 3 correspond to the controller 12000 and the heater 13000 of FIG. 1, respectively, and thus, repeated descriptions thereof will be omitted herein. The aerosol generating device 10000 illustrated in FIG. 3 illustrates components related to the present embodiment. Therefore, it will be understood by one of ordinary skill in the art related to the present embodiment that other components may be further included in the aerosol generating device 10000, in addition to the components illustrated in FIG. 3.

The heater 13000 included in the aerosol generating device 10000 may include a first electrically conductive track 310 and a second electrically conductive track 320. The second electrically conductive track 320 may have a higher temperature coefficient of resistance than the first electrically conductive track 310. A temperature coefficient of resistance refers to a rate at which a resistance value changes according to a temperature. As a temperature coefficient of resistance increases, a change in a resistance value according to a change in temperature becomes greater. As the temperature coefficient of resistance decreases, the change in the resistance value according to the change in the temperature becomes smaller. In general, because a metal has a positive temperature coefficient of resistance, a resistance value increases according to an increase in temperature.

In an example, the first electrically conductive track 310 and the second electrically conductive track 320 may be made of a material including at least one of tungsten, platinum, and molybdenum. However, the first electrically conductive track 310 and the second electrically conductive track 320 are not limited thereto. As long as the second electrically conductive track 320 has a higher temperature coefficient of resistance than the first electrically conductive track 310, each of the first electrically conductive track 310 and the second electrically conductive track 320 may be made of any suitable material. A temperature coefficient of resistance of the first electrically conductive track 310 may be less than 1,800 ppm/° C. when a temperature is about 25° C. to about 360° C., and a temperature coefficient of resistance of the second electrically conductive track 320 may be higher than or equal to 2,500 ppm/° C. when a temperature is about 25° C. to about 360° C.

The controller 12000 may heat a cigarette accommodated in the aerosol generating device 10000 by using the first electrically conductive track 310 in a first temperature change section, and heat the cigarette by using the second electrically conductive track 320 in a second temperature change section. The first temperature change section may correspond to a preheating section for increasing a temperature of the heater 13000 up to an operation temperature, and the second temperature change section may correspond to a smoking section for substantially maintaining the temperature of the heater 13000 at the operation temperature. Here, the operation temperature may refer to a temperature that is sufficiently high to generate an aerosol from an aerosol generating material included in the cigarette 20000. For example, the operation temperature may be about 200° C. to about 400° C., and may preferably be about 250° C. to about 330° C. However, the operation temperature is not limited thereto. Hereinafter, the first temperature change section and the second temperature change section will be described in more detail with reference to FIG. 4.

Figure 4:
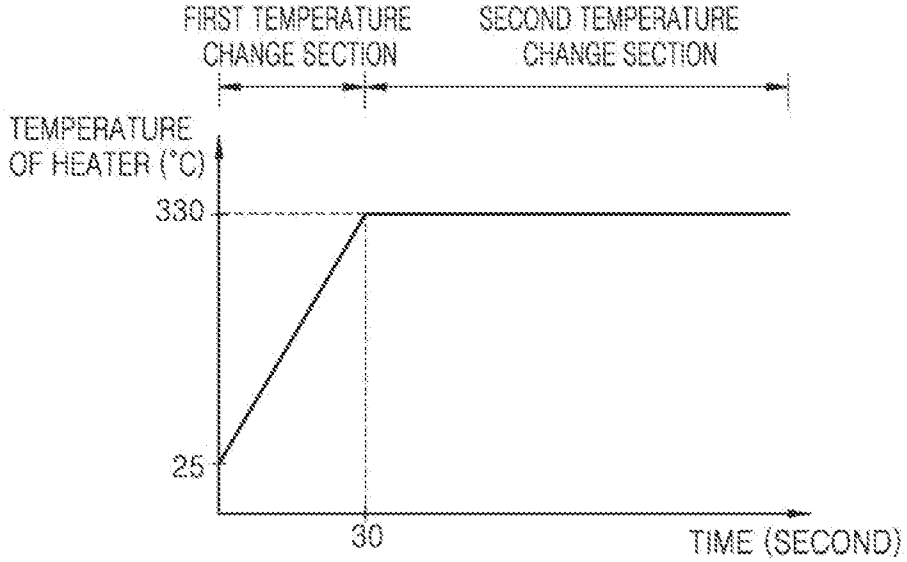
FIG. 4 is a graph illustrating an example of a temperature profile of an aerosol generating device, according to an embodiment.

FIG. 4 is a graph illustrating an example of a temperature profile of an aerosol generating device, according to an embodiment.

FIG. 4 illustrates an example of a temperature profile for generating an aerosol by heating a cigarette by an aerosol generating device. The aerosol generating device may perform preheating so that a sufficient aerosol may be generated from a cigarette before a user smokes using the aerosol generating device. For example, as shown in FIG. 4, the aerosol generating device may increase a temperature of a heater from room temperature (i.e., about 25° C.) to about 330° C. in about 30 seconds, so that the user may inhale an aerosol at any time when puffing. As described above, a preheating section in which a temperature is rapidly increased within a relatively short time may correspond to a first temperature change section. In an example, a rate of change in temperature of the heater may be greater than or equal to 8° C./s in the first temperature change section.

After the aerosol generating device finishes preheating, the aerosol generating device may substantially maintain the temperature of the heater at an operation temperature so that the user may smoke using the aerosol generating device. For example, the aerosol generating device may maintain the temperature of the heater at about 330° C. during a smoking section. As such, a smoking section in which a change in temperature is relatively small may correspond to a second temperature change section. In an example, a rate of change in the temperature of the heater may be less than 8° C./s in the second temperature change section.

The temperature profile illustrated in FIG. 4 is merely an example, and the aerosol generating device may heat the cigarette according to other temperature profiles. For example, the temperature of the heater may be higher or lower than 330° C. at a point in time when preheating of the aerosol generating device is completed.

According to embodiments, the aerosol generating device may not maintain the temperature of the heater constant in the smoking section but appropriately change the temperature of the heater based on the number of puffs by the user. Even in this case, as long as the rate of the change in the temperature of the heater over time is relatively small (e.g., less than 8° C./s) in the smoking section, the smoking section may correspond to the second temperature change section.

Referring to FIG. 3 again, the temperature coefficient of resistance of the first electrically conductive track 310 may be less than 1,800 ppm/° C. in the first temperature change section, and the temperature coefficient of resistance of the second electrically conductive track 320 may be higher than or equal to 2,500 ppm/° C. in the first temperature change section. Also, an initial resistance value (i.e., a resistance value at room temperature) of the first electrically conductive track 310 may be less than an initial resistance value of the second electrically conductive track 320.

As described above, the controller 12000 may heat the cigarette accommodated in the aerosol generating device 10000 by using the first electrically conductive track 310 having a low temperature coefficient of resistance in a preheating section, thereby increasing a current flowing through the heater 13000. As the first electrically conductive track 310 having the low temperature coefficient of resistance has a lower resistance value than the second electrically conductive track 320, a current flowing through the heater 13000 may be greater when the cigarette is heated by using the first electrically conductive track 310 than when the cigarette is heated by using the second electrically conductive track 320. As the current flowing through the heater 13000 increases, an amount of heat generated from the heater 13000 may increase, and a time needed for preheating may be reduced.

The controller 12000 may heat the cigarette by using the second electrically conductive track 320 having a high temperature coefficient of resistance in a temperature maintenance section (i.e., second temperature change section), thereby reducing a current flowing through the entire circuit including the heater 13000. As the second electrically conductive track 320 has the high temperature coefficient of resistance, its resistance value significantly increases during the preheating section, and thus has a higher resistance value than the first electrically conductive track 310 in the temperature maintenance section. Therefore, when the cigarette is heated by using the second electrically conductive track 320 in the temperature maintenance section, a current flowing through the entire circuit including the heater 13000 is reduced. Therefore, heating of an unintended portion of the aerosol generating device may be prevented, and unnecessary power loss may be minimized. Hereinafter, the strong points of heating a cigarette by using the second electrically conductive track 320 in the second temperature change section will be described in more detail with reference to FIG. 5.

Figure 5:
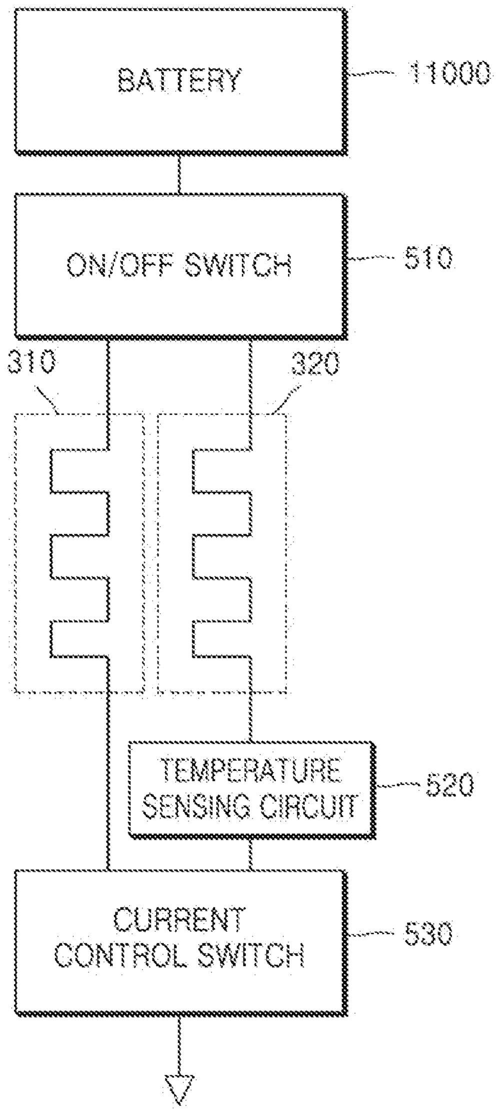
FIG. 5 is a view illustrating components of an aerosol generating device according to an embodiment.

FIG. 5 is a view illustrating components of an aerosol generating device, according to an embodiment.

FIG. 5 illustrates an example in which a battery 11000 supplies power to a first electrically conductive track 310 or a second electrically conductive track 320 included in a heater.

A controller (e.g., the controller 12000 of FIGS. 1 and 3) may control the battery 11000 to supply power to the first electrically conductive track 310 in a first temperature change section and control the battery 11000 to supply power to the second electrically conductive track 320 in a second temperature change section. An aerosol generating device may further include at least one switch for selecting between electrical connection of the battery 11000 and the first electrically conductive track 310 and electrical connection of the battery 11000 and the second electrically conductive track 320. For example, as illustrated in FIG. 5, the aerosol generating device may include an on/off switch 510.

By using the on/off switch 510, the controller may control the battery 11000 to supply power to the first electrically conductive track 310 in the first temperature change section and control the battery 11000 to supply power to the second electrically conductive track 320 in the second temperature change section.

The controller may detect a resistance value of the second electrically conductive track 320 and determine a temperature of the heater based on the detected resistance value and a temperature coefficient of resistance of the second electrically conductive track 320. As the second electrically conductive track 320 has a high temperature coefficient of resistance, a change in a resistance value according to a change in temperature may be great. Therefore, a change in the temperature of the heater may be finely reflected in a resistance value of the second electrically conductive track 320. In this regard, when the second electrically conductive track 320 is used, the temperature of the heater may be accurately detected.

In an example, the controller may use a temperature sensing circuit 520 electrically connected to the second electrically conductive track 320 to detect a resistance value of the second electrically conductive track 320, and determine a temperature of the heater based on the detected resistance value and a temperature coefficient of resistance of the second electrically conductive track 320. FIG. 5 illustrates that the temperature sensing circuit 520 is connected in series to the second electrically conductive track 320, but the temperature sensing circuit 520 is not limited thereto. The temperature sensing circuit 520 may be connected in parallel to the second electrically conductive track 320.

The controller may identify the first temperature change section and the second temperature change section based on the determined temperature. In an example, the controller may determine that the heater is operating in the first temperature change section when the determined temperature is less than a preset threshold, and determine that the heater is operating in the second temperature change section when the determined temperature is greater than or equal to the preset threshold. However, the controller is not limited thereto, and may calculate a rate of change in temperature over time based on the determined temperature and determine whether the heater is operating in the first temperature change section or the second temperature change section based on the calculated rate of the change in the temperature over time.

In an example, the aerosol generating device may further include a current control switch 530 for controlling a current flowing through a circuit formed inside the aerosol generating device not to exceed a preset limit. As described above, the circuit formed inside the aerosol generating device may further include additional circuit configurations such as the on/off switch 510, the temperature sensing circuit 520, and the current control switch 530, in addition to the battery 11000, the first electrically conductive track 310, and the second electrically conductive track 320. Also, parasitic resistance may exist in lines connecting the circuit configurations. Therefore, when a current flowing along the circuit formed inside the aerosol generating device is overly increased, heating of an unintended portion of the aerosol generating device may be prevented, and unnecessary power loss may occur.

The aerosol generating device 10000 according to the present disclosure may reduce a current flowing through the entire circuit including a heater by heating a cigarette with the second electrically conductive track 320 having a high temperature coefficient of resistance during a second temperature change section, thereby preventing heating of an unintended portion and minimizing unnecessary power loss.

Figure 6:
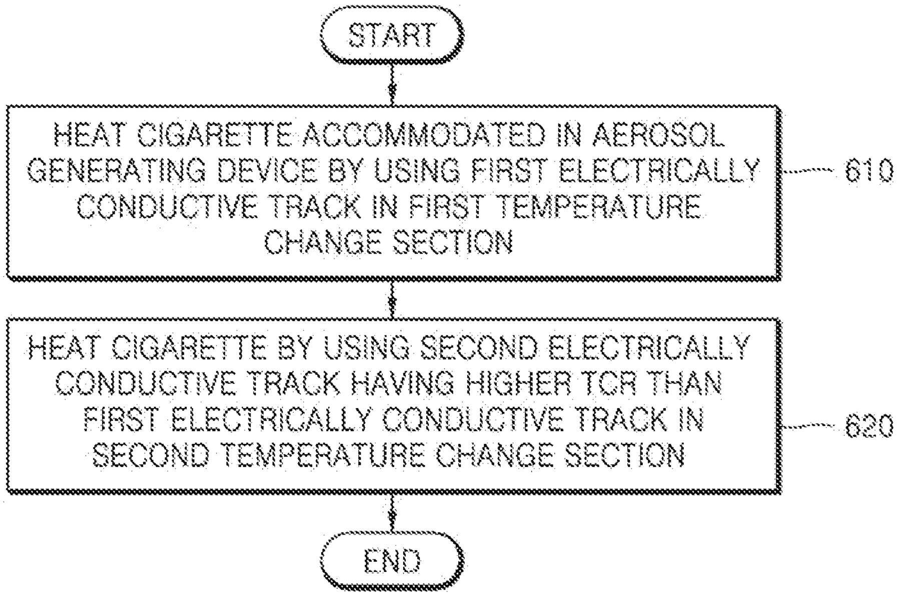
FIG. 6 is a flowchart illustrating a method of operating an aerosol generating device, according to an embodiment.

FIG. 6 is a flowchart illustrating a method of operating an aerosol generating device according to an embodiment.

Referring to FIG. 6, the method of operation of the aerosol generating device include operations that are processed in the aerosol generating device 10000 illustrated in FIGS. 1 and 3. Therefore, even if omitted below, the description of the aerosol generating device 10000 illustrated in FIGS. 1 and 3 may also be applied to the method of operation of the aerosol generating device shown in FIG. 6.

In operation 610, the aerosol generating device may heat a cigarette accommodated in the aerosol generating device by using a first electrically conductive track in a first temperature change section. The aerosol generating device may perform preheating so that sufficient aerosol is generated from the cigarette before a user smokes by using the aerosol generating device. The first temperature change section may correspond to a preheating section for increasing a temperature of a heater up to an operation temperature. As aforementioned, the temperature may be changed rapidly within a relatively short time during the first temperature change section. For example, a rate of change in temperature of the heater over time may be greater than or equal to 8° C./s in the first temperature change section. A temperature coefficient of resistance of the first electrically conductive track may be less than 1,800 ppm/° C. in the first temperature change section, but is not limited thereto.

The aerosol generating device may control a battery to supply power to the first electrically conductive track in the first temperature change section. For example, the aerosol generating device may control the battery to supply power to the first electrically conductive track in the first temperature change section by using at least one switch for selecting between electrical connection of the battery and the first electrically conductive track and electrical connection of the battery and a second electrically conductive track.

In operation 620, the aerosol generating device may heat the cigarette by using the second electrically conductive track having a higher temperature coefficient of resistance than the first electrically conductive track in a second temperature change section. The aerosol generating device may substantially maintain the temperature of the heater at the operation temperature after preheating is completed so that the user may smoke by using the aerosol generating device. The second temperature change section may correspond to a smoking section in which the temperature of the heater is substantially maintained at the operation temperature. As aforementioned, a change in temperature is relatively small in the second temperature change section. For example, a rate of change in the temperature of the heater over time may be less than 8° C./s in the second temperature change section. A temperature coefficient of resistance of the second electrically conductive track may be greater than or equal to 2,500 ppm/° C. in the first temperature change section, but is not limited thereto.

The aerosol generating device may control the battery to supply power to the second electrically conductive track in the second temperature change section. For example, the aerosol generating device may control the battery to supply power to the second electrically conductive track in the second temperature change section by using at least one switch for selecting between electrical connection of the battery and the first electrically conductive track and electrical connection of the battery and the second electrically conductive track.

The aerosol generating device may detect a resistance value of the second electrically conductive track, determine the temperature of the heater based on the detected resistance value and the temperature coefficient of resistance of the second electrically conductive track, and identify the first temperature change section and the second temperature change section based on the determined temperature. In an example, the aerosol generating device may determine that the heater is operating in the first temperature change section if the determined temperature is less than a preset threshold, and determine that the heater is operating in the second temperature change section if the determined temperature is greater than or equal to the preset threshold. However, the aerosol generating device is not limited thereto. For example, the aerosol generating device may calculate a rate of change in temperature over time based on the determined temperature, and identify the first temperature change section and the second temperature change section based on the calculated rate of the change in temperature over time.

The method illustrated in FIG. 6 may be recorded on a computer-readable recording medium in the form of one or more programs including instructions for executing the method have been recorded. Examples of the computer-readable recording medium may include magnetic media such as a hard disk, a floppy disk, and a magnetic tape, optical media such as CD-ROM and DVD, magneto-optical media such as a floptical disk, and a hardware device specifically configured to store and perform a program instruction such as ROM, RAM, flash memory, or the like. Examples of the program instruction include high-level language code executable by a computer by using an interpreter or the like, as well as machine language code made by compiler.

At least one of the components, elements, modules or units (collectively "components" in this paragraph) represented by a block in the drawings, such as the controller 12000 in FIGS. 1 and 3, may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Those of ordinary skill in the art related to the present embodiments may understand that various changes in form and details can be made therein without departing from the scope of the characteristics described above. The disclosed methods should be considered in a descriptive sense only and not for purposes of limitation. The scope of the present disclosure is defined by the appended claims rather than by the foregoing description, and all differences within the scope of equivalents thereof should be construed as being included in the present disclosure.

What is claimed is:

1. An aerosol generating device comprising:

a heater including a first electrically conductive track and a second electrically conductive track having a higher temperature coefficient of resistance than the first electrically conductive track;

a battery configured to supply power to the heater; and a controller configured to control the battery to selectively supply power to the first electrically conductive track for heating a tobacco rod of a cigarette accommodated in the aerosol generating device in a first temperature change section or supply power to the second electrically conductive track for heating the tobacco rod of the cigarette in a second temperature change section, the cigarette comprising the tobacco rod and a filter rod, wherein the first temperature change section corresponds to a preheating section for increasing a temperature of the heater up to an operation temperature, and the second temperature change section corresponds to a smoking section for substantially maintaining the temperature of the heater at the operation temperature, and wherein the operation temperature is a temperature at which aerosol is generated from an aerosol generating material included in the tobacco rod.

2. The aerosol generating device of claim 1, wherein a rate of change in a temperature of the heater over time is greater than or equal to 8° C./s in the first temperature change section and less than 8° C./s in the second temperature change section.

3. The aerosol generating device of claim 1, further comprising at least one switch configured to select between electrical connection of the battery and the first electrically conductive track and electrical connection of the battery and the second electrically conductive track, wherein the controller is further configured to control the at least one switch such that the battery supplies power to the first electrically conductive track in the first temperature change section and supplies power to the second electrically conductive track in the second temperature change section.

4. The aerosol generating device of claim 1, wherein the controller is further configured to detect a resistance value of the second electrically conductive track, determine the temperature of the heater based on the detected resistance value and a temperature coefficient of resistance of the second electrically conductive track, and identify the first temperature change section and the second temperature change section based on the determined temperature.

5. The aerosol generating device of claim 1, wherein a temperature coefficient of resistance of the first electrically conductive track is less than 1,800 ppm/° C. in the first temperature change section, and a temperature coefficient of resistance of the second electrically conductive track is greater than or equal to 2,500 ppm/° C. in the second temperature change section.

6. A method of operating an aerosol generating device, the method comprising:

controlling a battery to supply power to a first electrically conductive track for heating a tobacco rod of cigarette accommodated in the aerosol generating device in a first temperature change section corresponding to a preheating section for increasing a temperature of the heater up to an operation temperature; and controlling the battery to selectively supply power to a second electrically conductive track having a higher temperature coefficient of resistance than the first electrically conductive track for heating the tobacco rod of the cigarette in a second temperature change section corresponding to a smoking section for substantially maintaining the temperature of the heater at the operation temperature, wherein the operation temperature is a temperature at which aerosol is generated from an aerosol generating material included in the tobacco rod.

7. A computer-readable recording medium having recorded thereon one or more programs including instructions for executing the method of claim 6.

* * * * *